United States Patent
Ito

(10) Patent No.: US 10,404,891 B2
(45) Date of Patent: Sep. 3, 2019

(54) IMAGE READING APPARATUS AND METHOD FOR PERFORMING SHADING CORRECTION USING REFERENCE DATA GENERATED BY READING A MOVING SURFACE OF REFERENCE PLATE AND POSITIONING THAT PLATE BASED ON SHEET SIZE

(71) Applicants: KABUSHIKI KAISHA TOSHIBA, Tokyo (JP); TOSHIBA TEC KABUSHIKI KAISHA, Tokyo (JP)

(72) Inventor: Takeshi Ito, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/028,078

(22) Filed: Jul. 5, 2018

(65) Prior Publication Data

US 2018/0316825 A1 Nov. 1, 2018

Related U.S. Application Data

(63) Continuation of application No. 15/401,532, filed on Jan. 9, 2017, now Pat. No. 10,021,268.

(51) Int. Cl.
| | |
|---|---|
| *H04N 1/00* | (2006.01) |
| *H04N 1/047* | (2006.01) |
| *H04N 1/10* | (2006.01) |
| *H04N 1/12* | (2006.01) |
| *H04N 1/40* | (2006.01) |

(Continued)

(52) U.S. Cl.
CPC ............ *H04N 1/401* (2013.01); *H04N 1/0005* (2013.01); *H04N 1/00013* (2013.01);
(Continued)

(58) Field of Classification Search
CPC ............ H04N 1/00519; H04N 1/00557; H04N 1/00559; H04N 1/00795; H04N 1/00798; H04N 1/00811; H04N 1/00814; H04N 1/00819; H04N 1/00822; H04N 1/00824; H04N 1/04; H04N 1/0464; H04N 1/047; (Continued)

(56) References Cited

U.S. PATENT DOCUMENTS 6,166,394 A * 12/2000 Rubscha ............ H04N 1/00737 250/235
6,295,140 B1 9/2001 Kameyama
(Continued)

*Primary Examiner* — Scott A Rogers
(74) *Attorney, Agent, or Firm* — Kim & Stewart LLP

(57) ABSTRACT

An image reading apparatus according to an embodiment includes an image reading unit that generates reference data by reading a reference surface and generates image data by reading a sheet. A reference plate includes the reference surface for generating the reference data for shading correction of the image reading unit and a background surface for background of a sheet to be read to generate the image data. A control unit controls the positions of the image reading unit and the reference plate to be at a first position relative to each other when the reference data is to be generated and at a second position relative to each other when the image data is to be generated. The second position is different from the first position. A shading correction unit performs the shading correction in the image reading unit based on the generated reference data.

14 Claims, 14 Drawing Sheets

(51) Int. Cl.
*H04N 1/401* (2006.01)
*H04N 1/407* (2006.01)
*H04N 1/409* (2006.01)

(52) U.S. Cl.
CPC ..... *H04N 1/00034* (2013.01); *H04N 1/00045* (2013.01); *H04N 1/00068* (2013.01); *H04N 1/00082* (2013.01); *H04N 1/00519* (2013.01); *H04N 1/00798* (2013.01); *H04N 1/00806* (2013.01); *H04N 1/00819* (2013.01); *H04N 1/00822* (2013.01); *H04N 1/047* (2013.01); *H04N 1/1061* (2013.01); *H04N 1/124* (2013.01); *H04N 1/125* (2013.01); *H04N 1/40006* (2013.01); *H04N 1/4076* (2013.01); *H04N 1/4097* (2013.01); *H04N 1/407* (2013.01); *H04N 2201/0081* (2013.01)

(58) Field of Classification Search
CPC ...... H04N 1/10; H04N 1/1061; H04N 1/1065; H04N 1/12; H04N 1/1235; H04N 1/124; H04N 1/1245; H04N 1/125; H04N 1/40; H04N 1/40006; H04N 1/401; H04N 1/407; H04N 1/4076; H04N 1/4078; H04N 1/409; H04N 1/4095; H04N 1/56; H04N 1/58; H04N 1/60; H04N 1/6027; H04N 1/6077; H04N 1/6086; H04N 1/603–605; G06K 15/027; G06K 15/1872

See application file for complete search history.

(56) References Cited

U.S. PATENT DOCUMENTS

| | | | |
|---|---|---|---|
| 7,518,760 B2 | 4/2009 | Matsuda | |
| 7,558,437 B2 | 7/2009 | Misaka | |
| 7,633,653 B2 * | 12/2009 | Nishizawa | H04N 1/121 |
| | | | 358/408 |
| 7,692,818 B2 * | 4/2010 | Futami | H04N 1/121 |
| | | | 358/3.26 |
| 7,777,918 B2 | 8/2010 | Sekizawa et al. | |
| 8,004,726 B2 | 8/2011 | Misaka | |
| 8,115,970 B2 | 2/2012 | Hasegawa | |
| 8,553,295 B2 | 10/2013 | Nishida et al. | |
| 8,717,636 B2 | 5/2014 | Lee et al. | |
| 8,749,860 B2 | 6/2014 | Arima | |
| 8,970,861 B2 | 3/2015 | Nikaku | |
| 9,258,456 B2 | 2/2016 | Inoue | |
| 9,270,837 B1 * | 2/2016 | Whitesell | H04N 1/00018 |
| 9,930,212 B2 * | 3/2018 | Fusayasu | H04N 1/19 |
| 10,033,892 B2 * | 7/2018 | Nomoto | H04N 1/00588 |
| 10,136,027 B2 * | 11/2018 | Misaka | H04N 1/401 |
| 10,158,766 B2 * | 12/2018 | Netsu | H04N 1/00018 |
| 10,218,872 B2 * | 2/2019 | Horiguchi | H04N 1/0057 |
| 2012/0112401 A1 | 5/2012 | Tokutsu et al. | |
| 2017/0180603 A1 | 6/2017 | Hatayama et al. | |
| 2017/0214816 A1 | 7/2017 | Yamakawa et al. | |
| 2018/0288240 A1 * | 10/2018 | Xu | H04N 1/00087 |
| 2019/0068830 A1 * | 2/2019 | Misaka | H04N 1/401 |

* cited by examiner ized sheet such as a name card or a receipt, the sheet
IMAGE READING APPARATUS AND METHOD FOR PERFORMING SHADING CORRECTION USING REFERENCE DATA GENERATED BY READING A MOVING SURFACE OF REFERENCE PLATE AND POSITIONING THAT PLATE BASED ON SHEET SIZE

CROSS-REFERENCE TO RELATED APPLICATION

This application is a continuation of U.S. patent application Ser. No. 15/401,532, filed on Jan. 9, 2017, the entire contents of each of which are incorporated herein by reference.

FIELD

Embodiments described herein relate generally to an image reading apparatus and a method for generating image data.

BACKGROUND

An image reading apparatus reads an image on a sheet by using an image sensor such as a charge coupled device (CCD) or a contact image sensor (CIS). In such an image reading apparatus, when reading a sheet other than a standard sized sheet such as a name card or a receipt, the sheet is read as any standard size. However, if the non-standard sized sheet is read as a standard size, there is a possibility that the image includes a portion in which there is no sheet.

DETAILED DESCRIPTION

An image reading apparatus according to an embodiment includes an image reading unit that generates reference data by reading a reference surface and generates image data by reading a sheet. A reference plate includes the reference surface for generating the reference data for shading correction of the image reading unit and a background surface for background of a sheet to be read to generate the image data. A control unit controls the positions of the image reading unit and the reference plate to be at a first position relative to each other when the reference data is to be generated and at a second position relative to each other when the image data is to be generated. The second position is different from the first position. A shading correction unit performs the shading correction in the image reading unit based on the generated reference data.

Hereinafter, an image reading apparatus and an image reading method according to the embodiment will be described with reference to drawings.

Figure 1:
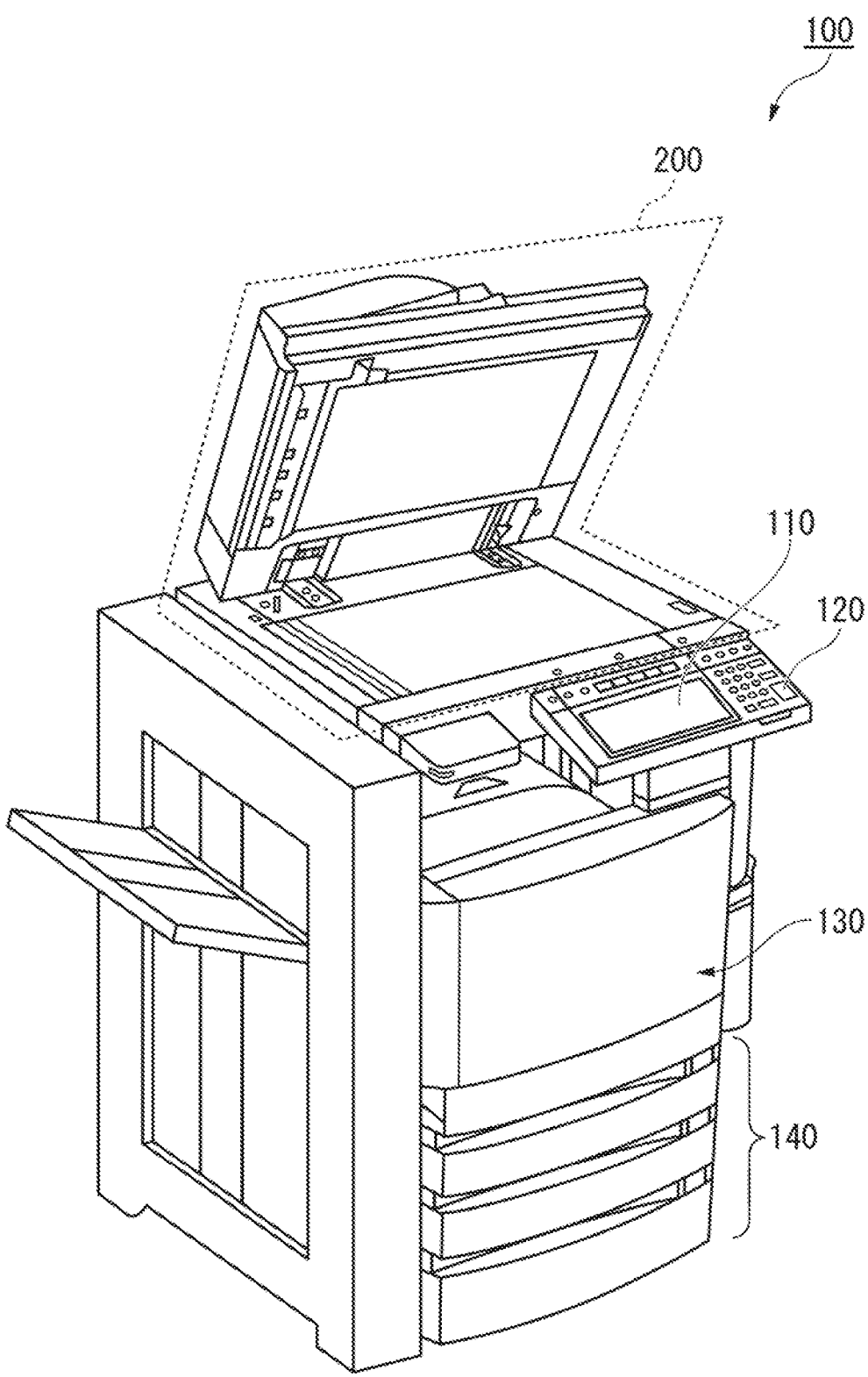
FIG. 1 is a perspective diagram illustrating an example configuration of an image forming apparatus of an embodiment.

FIG. 1 is a perspective illustrating an example configuration of an image forming apparatus 100 according to an embodiment.

The image forming apparatus 100 is, for example, a multifunction peripheral. The image forming apparatus 100 includes a display 110, a control panel 120, a printer unit 130, a sheet housing unit 140, and an image reading unit 200. The printer unit 130 of the image forming apparatus 100 may be a device which forms a toner image, or may be an ink jet type device.

The image forming apparatus 100 forms an image on a sheet using a developer such as toner. The sheet is, for example, a paper, or a label sheet. The sheet may be any sheet as long as an image can be formed on the front surface of the sheet by the image forming apparatus 100.

The display 110 is an image display device such as a liquid crystal display (LCD), or an organic electro luminescence (EL) display. The display 110 displays various information items relating to the image forming apparatus 100.

The control panel 120 includes a plurality of buttons. The control panel 120 receives input of an operation from a user. The control panel 120 outputs a signal in accordance with the operation input by the user to a control unit of the image forming apparatus 100. The display 110 and the control panel 120 may be configured as an integrated touch panel.

The printer unit 130 forms an image on the sheet based on image information generated by the image reading unit 200 or image information received through a communication interface. The printer unit 130 forms an image by the following process, for example. An image forming unit of the printer unit 130 forms an electrostatic latent image on a photoreceptor drum based on the image information. The image forming unit of the printer unit 130 forms a visible image by applying a developer to the electrostatic latent image. As an example of the developer, toner may be used. A transfer unit of the printer unit 130 transfers the visible image to a sheet (different from a target sheet that was read). The fixing unit of the printer unit 130 fixes the visible image on the sheet by performing heating and pressing the sheet. The sheet on which the image is formed may be a sheet which is stored in the sheet housing unit 140. Alternatively, the sheet may be manually fed.

The sheet housing unit 140 stores the sheet to be used for forming an image in the printer unit 130.

The image reading unit 200 reads image information of a read target as brightness and darkness of light. The image reading unit 200 records the read image information. The recorded image information may be transmitted to the other information processing device through a network. The recorded image information may be formed as an image on the sheet by the printer unit 130.

Figure 2:
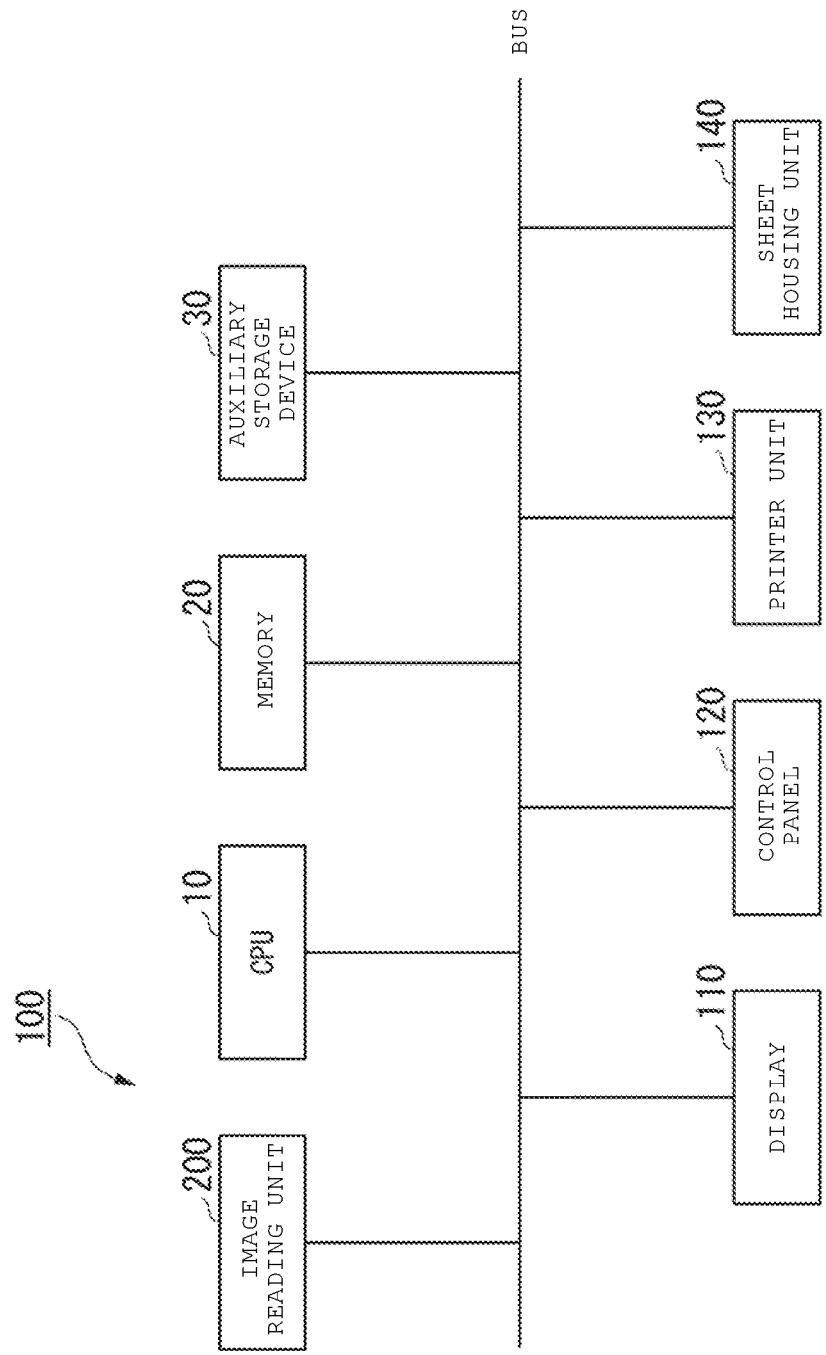
FIG. 2 illustrates an example schematic configuration of the image forming apparatus.

FIG. 2 illustrates an example schematic configuration of the image forming apparatus 100.

The image forming apparatus 100 includes a central processing unit (CPU) 10, a memory 20, and an auxiliary storage device 30 which is connected by a bus and executes a program. The image forming apparatus 100 includes the display 110, the control panel 120, the printer unit 130, the sheet housing unit 140, and the image reading unit 200, controlled by executing the program. The various functions or a portion of the image forming apparatus 100 may be implemented using the hardware such as an application specific integrated circuit (ASIC), a programmable logic device (PLD), or a field programmable gate array (FPGA). The program may be recorded on a computer readable recording medium. The computer readable recording medium is, for example, a portable medium such as a flexible disk, a magnetic-optical disk, a ROM, and a CD-ROM, and a storage device such as a hard disk equipped in a computer system. The program may be transmitted over a network connection.

The CPU 10 reads the program stored in the auxiliary storage device 30 to the memory 20 and executes the program. Thereby, the CPU 10 serves as a control unit that controls each functional unit of the image forming apparatus 100. The CPU which serves as the control unit may be separate from each functional unit. For example, the CPU that controls each functional of the image reading unit 200 may be included in the image reading unit 200.

The memory 20 is, for example, a random access memory (RAM). The memory 20 stores data to be used by each functional unit which is included in the image forming apparatus 100, temporarily. The memory 20 may store digital data generated by the image reading unit 200.

The auxiliary storage device 30 is, for example, a hard disk or a solid state drive (SSD) and stores various data items. The various data items are, for example, image data. The image data is digital data generated by the image reading unit 200.

Figure 3:
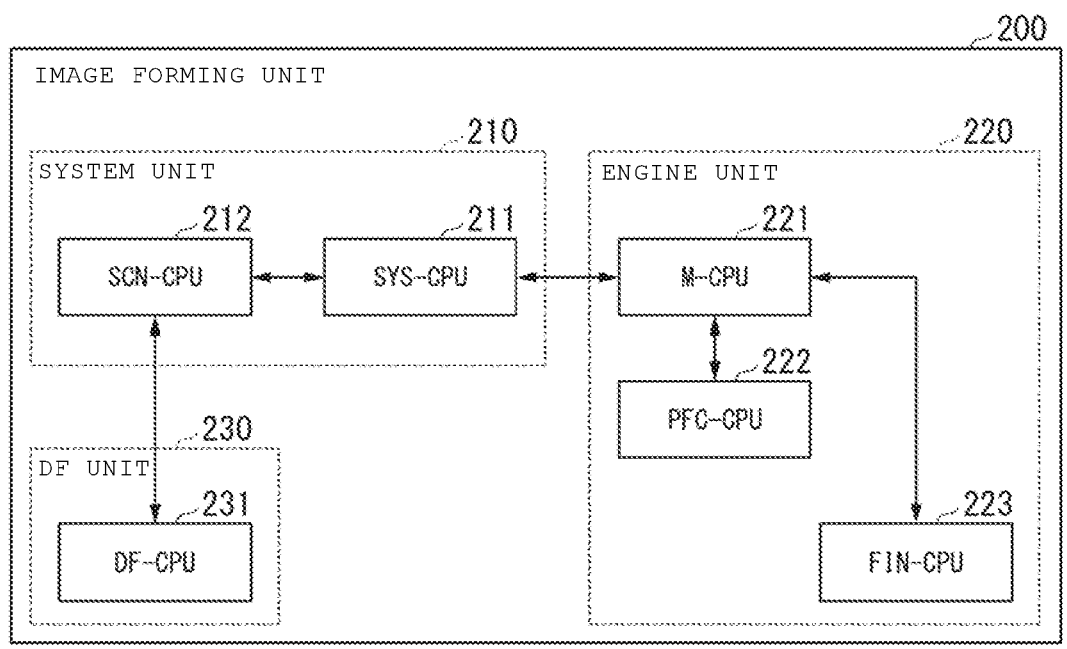
FIG. 3 illustrates an example configuration of a control unit of the image forming apparatus.

FIG. 3 illustrates an example configuration example of a control unit in the image forming apparatus 100 according to the embodiment. The image forming apparatus 100 includes a system unit 210, an engine unit 220, and a DF unit 230. The system unit 210 includes a SYS-CPU 211 and a SCN-CPU 212. The SYS-CPU 211 is a main CPU of the image forming apparatus 100 and executes a process relating to a control of entire the apparatus. The SCN-CPU 212 executes a process relating to the control of the image reading unit 200.

The engine unit 220 includes an M-CPU 221, a PFC-CPU 222, and a FIN-CPU 223. The M-CPU 221 is a main CPU in the engine unit 220. The M-CPU 221 controls a control target of the engine unit 220 is operated in cooperation with the other functional units of the image forming apparatus 100, by a cooperation operation of the SYS-CPU 211. The control target of the engine unit is feeding, conveying, and discharging the sheet. Generally, the functional unit relating to feeding or transmitting of the sheet is referred to as a sheet feeding unit and the functional unit relating to an alignment of the fed sheet or discharging of the sheet is referred to as a finisher. For example, the sheet housing unit 140 or various rollers to be described are included in the sheet feeding unit.

The PFC-CPU 222 controls the sheet feeding unit. The FIN-CPU 223 controls the finisher. The DP unit 230 includes a DF-CPU 231. The DF-CPU 231 executes a process relating to a control of an auto document feeder (ADF) of the image reading unit 200. A control unit 71 of the image reading unit 200, to be described below, may be implemented by the DF-CPU 231 or SCN-CPU 212, for example.

Figure 4:
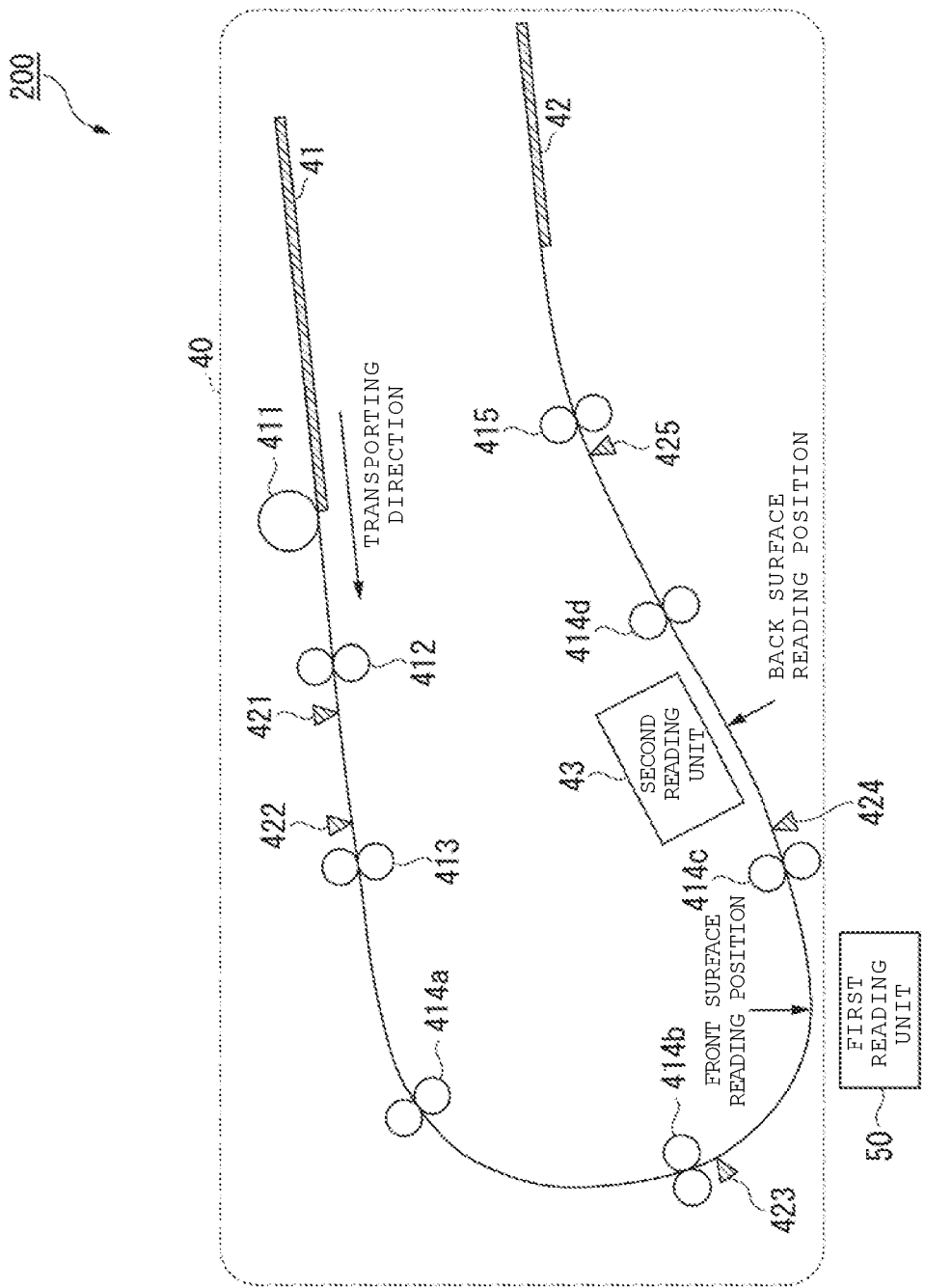
FIG. 4 illustrates an example internal configuration of an image reading unit.

FIG. 4 illustrates an example internal configuration example of an image reading unit 200.

The image reading unit 200 includes an automatic document feeder (ADF) 40 and a first reading unit 50. Here, the ADF 40 functions as a reading device of a sheet back surface and the first reading unit 50 functions a reading device of a sheet front surface.

The ADF 40 includes a sheet placement unit 41, a sheet feeding roller 411, a separation roller 412, a registration roller 413, a transporting roller 414a, a transporting roller 414b, a transporting roller 414c, a transporting roller 414d, a sheet discharging roller 415, a sheet discharging unit 42, and a second reading unit 43.

A sheet is initially positioned on the sheet placement unit 41.

The sheet feeding roller 411 feeds the sheet positioned on the sheet placement unit 41.

The separation roller 412 separates the sheets fed by the sheet feeding roller 411 one by one and feeds the sheet to the registration roller 413.

The registration roller 413 aligns a leading end of the sheet fed from the separation roller 412. The registration roller 413 sends the sheet in which the leading end is aligned in a sheet transport direction.

The transporting rollers 414a, 414b, 414c, and 414d send the sheet transported by the registration roller 413 in the sheet transport direction. In the following description, when the transporting rollers 414a, 414b, 414c, and 414d are not distinguished, the roller is described as the transporting roller 414.

The sheet discharging roller 415 sends the sheet transported by the transporting roller 414 to the sheet discharging unit.

The sheet discharging unit 42 stacks the sheet sent by the transporting roller 414.

The second reading unit 43 includes a light source lighting the back surface of the sheet and an image sensor such as a CCD or CIS. The second reading unit 43 generates image data of the back surface by lighting the back surface of the transported sheet with the light source and reading the back surface.

Furthermore, the ADF 40 includes various sensors for detecting the sheet moving on a transporting path.

Specifically, the ADF 40 further includes a separation rear sensor 421, a registration sensor 422, a front surface position sensor 423, a rear surface position sensor 424, and a sheet discharging sensor 425.

The separation rear sensor 421 detects the sheet sent from the separation roller 412.

The registration sensor 422 detects the sheet which is transported to the registration roller 413.

The front surface position sensor 423 detects the sheet sent toward a reading position (hereinafter, referred to as a "front surface reading position") of the first reading unit 50 from the transporting roller 414b.

The back surface position sensor 424 detects the sheet sent toward a reading position (hereinafter, referred to as a "back surface reading position") of the second reading unit 43 from the transporting roller 414c.

The sheet discharging sensor 425 detects the sheet sent from the sheet discharging roller 415 toward the sheet discharging unit 42.

The first reading unit 50 includes a light source lighting the front surface of the sheet displaced on the sheet placement unit 41 and an image sensor such as a CCD or CIS. The first reading unit 50 generates image data of the front surface by lighting the front surface of the sheet displaced on the sheet placement unit 41 with the light source and reading the back surface.

Figure 5:
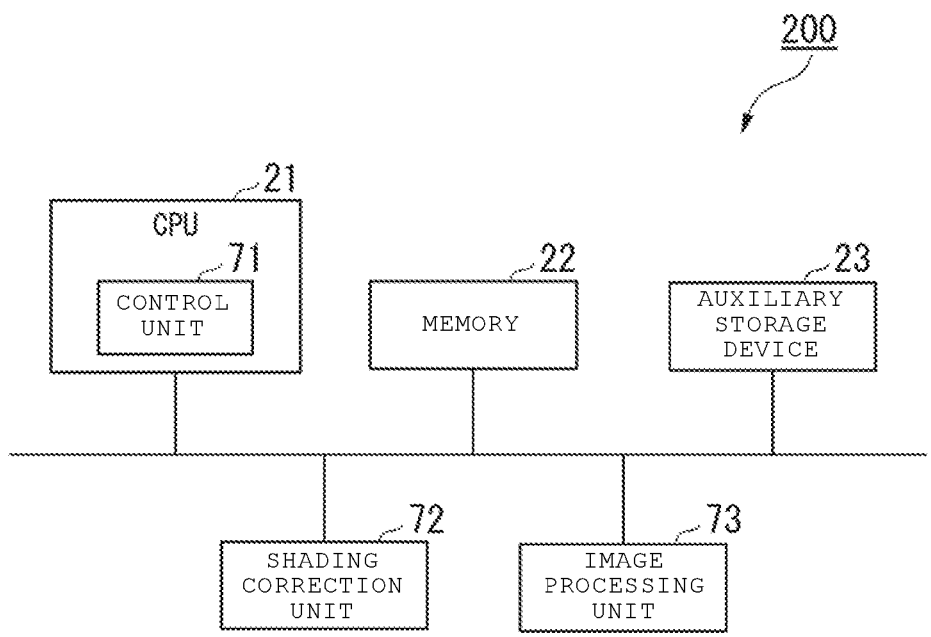
FIG. 5 illustrates an example functional-block configuration of the image reading unit.

FIG. 5 illustrates an example functional-block configuration of the image reading unit 200.

The image reading unit 200 includes a CPU 21, a memory 22, and an auxiliary storage device 23 which is connected by a bus and executes a program. The image reading unit 200 includes the control unit 71, a shading correction unit 72, and an image processing unit 73, implemented by executing the program. The various functions or a part of the various functions of the image reading unit 200 may be implemented using the hardware such as an ASIC, a PLD, or a FPGA. The program may be recorded on a computer readable recording medium. The computer readable recording medium is, for example, a portable medium such as a flexible disk, a magnetic-optical disk, a ROM, and a CD-ROM, or a storage device such as a hard disk equipped in a computer system. The program may be transmitted over a network connection.

The CPU 21 reads the program stored in the auxiliary storage device 23 to the memory 22 and executes the program. Thereby, the CPU 21 serves as the control unit 71 that controls each functional unit of the image reading unit 200. The CPU 21 can transmit and receive control information between the CPU 21 and the CPU 10 by communicating with the CPU 10. By transmitting and receiving the control information, the CPU 21 can operate the image reading unit 200 as a part of the image forming apparatus 100.

The memory 22 is, for example, a random access memory (RAM). The memory 22 stores data to be used by each functional unit which is included in the image reading unit 200, temporarily. The memory 22 may store digital data generated by the first reading unit 50 or the second reading unit 43.

The auxiliary storage device 23 is, for example, a hard disk or a solid state drive (SSD), and stores various data items. The various data items are, for example, image data. The image data is digital data generated by the first reading unit 50 or the second reading unit 43.

The control unit 71 controls the operation of each functional unit included in the image reading unit 200. The control unit 71 controls various roller included in the image reading unit 200 or operations of the first reading unit 50, the second reading unit 43, the shading correction unit 72, and the image processing unit 73.

The shading correction unit 72 executes a shading correction relating to reading of the front surface and the back surface of the sheet. The shading correction is a process for correcting a gain according to characteristics of a reading unit such that an unevenness of the image in the read image data is avoided. Information indicating a reference color to be used when correcting the gain (hereinafter, referred to as "reference data") is required for performing the shading correction. The reference color for the correction is generally white or black. The image reading unit 200 includes a reference surface (hereinafter, a "white reference surface") colored white to be reference for each of the first reading unit 50 and the second reading unit 43. The image reading unit 200 acquires white reference data by imaging the white reference surfaces with respect to the first reading unit 50 and the second reading unit 43. On the other hand, the image reading unit 200 acquires black reference data by imaging with respect to the first reading unit 50 and the second reading unit 43 in a state where the light source is turned off. The image reading unit 200 includes a reference surface (hereinafter, referred to as a "black reference surface") colored black to be reference in the same manner as in the white reference data. The image reading unit 200 may acquire the black reference data by imaging the black reference surfaces with respect to the first reading unit 50 and the second reading unit 43. When the image information of the sheet is generated, the shading correction unit 72 corrects the gains of the first reading unit 50 and the second reading unit 43 by acquiring the reference data that was generated before the reading of the sheet is performed. The shading correction unit 72 may be implemented by using the hardware such as the ASIC, the PLD, or the FPGA.

The image processing unit 73 (an example of a skew correction unit) performs various image processes with respect to the acquired image data. For example, the image processing unit 73 performs a process for correcting the brightness of the image, a process for emphasizing an outline of the image, a process for reducing a noise, or the like. In addition to the process, the image processing unit 73 according to the embodiment performs the skew correction for correcting distortion (hereinafter, referred to as skew) of the acquired image of the sheet to the image data. The skew correction is implemented by detecting an edge of the sheet from the image data and geometrically deforming an image based on the position of the detected edge.

Figure 6:
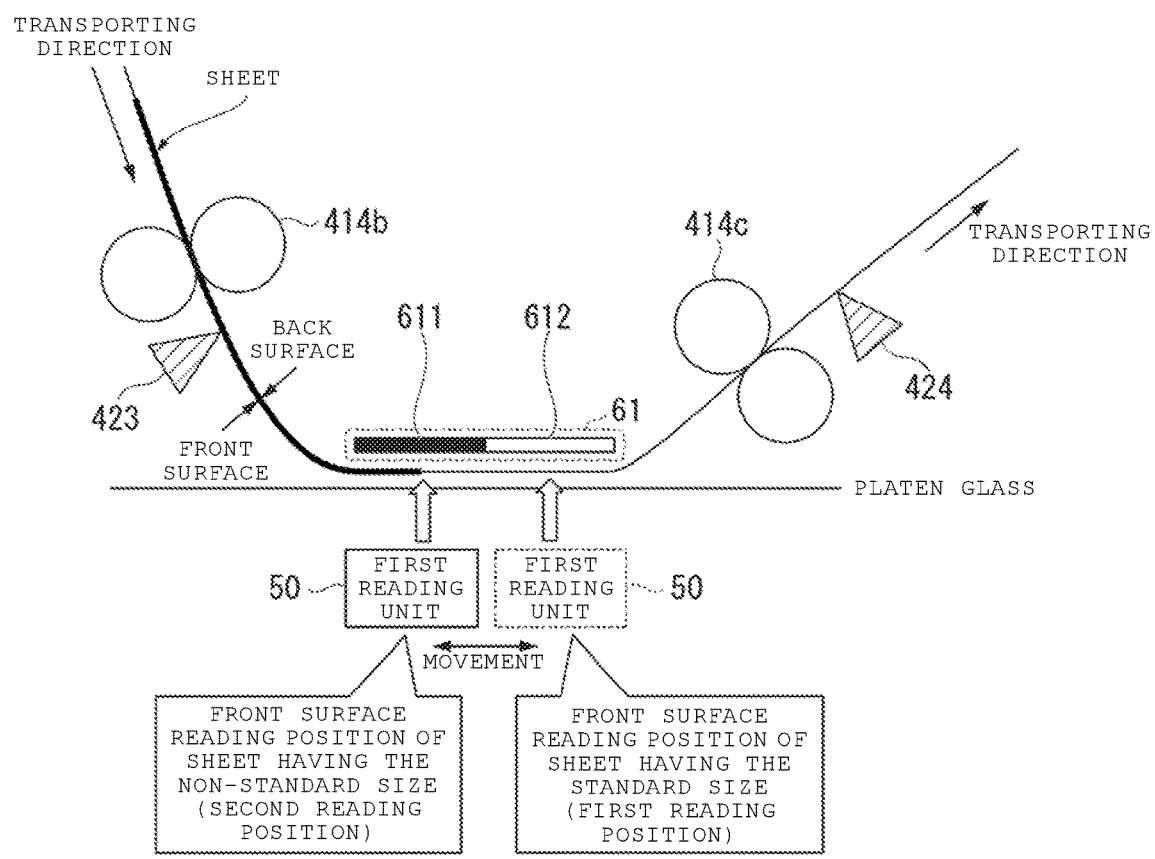
FIG. 6 illustrates a reading position of a first reading unit.

FIG. 6 illustrates a reading position of the first reading unit 50.

The first reading unit 50 includes a front surface guide 61 (an example of the first reference plate) to be a guide of the sheet when the reading of the sheet front surface is performed. The front surface guide 61 includes a first guide unit 611 and a second guide unit 612. The first guide unit 611 (an example of a first background surface) is used as a back surface of the sheet in the reading of the non-standard sized sheet. On the other hand, the second guide unit 612 is used as aback surface of the sheet in the reading of the standard sized sheet. The first guide unit 611 is used for a background of the sheet in the reading of the non-standard sized sheet. Specifically, the first guide unit 611 has a background color that the outline of the non-standard sized sheet is distinguishable. For example, the first guide unit 611 has a black background color. The background color of the first guide unit 611 may be a color other than black as long as a color can be distinguished from the outline of the non-standard sized sheet (generally, white) to be read. In addition, the first guide unit 611 may include a background pattern such as a halftone screening instead of the background color as long as the pattern can be distinguished from the outline of the non-standard sized sheet (generally, white).

When the reading of the non-standard sized sheet is performed, the control unit 71 moves the first reading unit 50 to a position (hereinafter, referred to as a "first leading position") where the imaging unit of the first reading unit 50 faces the first guide unit 611. The first reading unit 50 performs an imaging operation in the first reading unit, so that the non-standard sized sheet is read with the first guide unit 611 set as the background.

On the other hand, when the reading of the standard sized sheet is performed, the control unit 71 moves the first reading unit 50 to a position (hereinafter, referred to as a "second reading position") where the imaging unit of the first reading unit 50 faces the second guide unit 612.

The front surface guide 61 may include a reference plate to be used for performing the shading correction described above. For example, the front surface guide 61 may include a third guide unit to be a reference plate in addition to the first guide unit 611 and the second guide unit 612. In this case, when the shading correction of the first reading unit 50 is performed, the control unit 71 moves the first reading unit 50 to the position (hereinafter, referred to as a "third reading position") where the imaging unit of the first reading unit 50 faces the third guide unit. The first reading unit 50 acquires the image of the reference surface to be required to acquire the reference data by performing the imaging operation in the third reading position.

Figure 7:
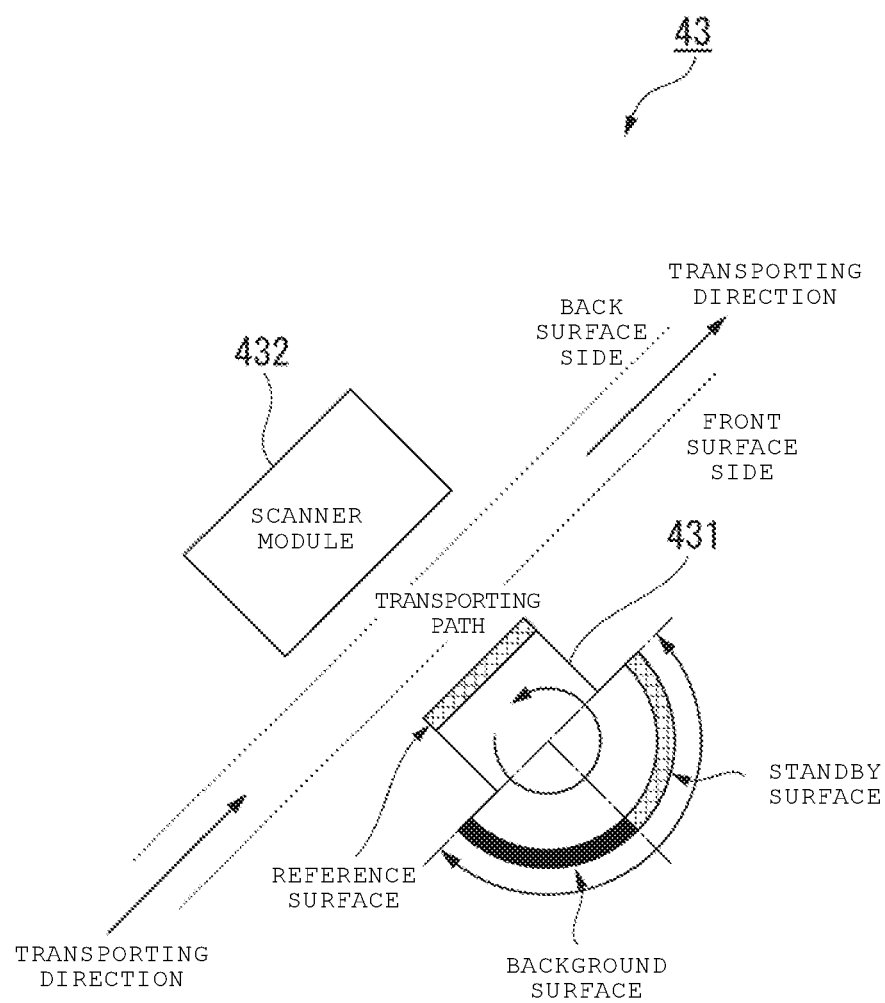
FIG. 7 illustrates a reading position of a second reading unit.

FIG. 7 illustrates a reading position of the second reading unit 43.

The second reading unit 43 includes a reference roller 431 (an example of the second reference plate) and a scanner module 432.

When the reading of the sheet back surface is performed, the reference roller 431 serves as a guide of the sheet and also includes a reference surface for acquiring the reference data to be used to perform the shading correction to the roller surface thereof. Among the roller surfaces of the reference roller 431, an area other than the reference surface is referred to as a standby surface. For example, as illustrated in FIG. 6, the reference roller 431 includes each half of the roller surface as the reference surface and the standby surface.

The reference roller 431 can be rotated with respect to the paper surface by controlling the driving unit (for example, a motor or the like) by the control unit 71. By rotating, the reference roller 431 can change the positions of the reference surface and the standby surface with respect to the scanner module 432. At the time that the reference data is acquired, the control unit 71 rotates the reference roller 431 so that the scanner module 432 faces the reference surface. On the other hand, when the reference data is not acquired, the control unit 71 rotates the reference roller 431 so that the scanner module 432 faces the standby surface. By controlling the reference roller 431, the image forming apparatus 100 can control a contaminant that may adhere to the reference surface due to contact with the sheet or the like.

In addition, the standby surface of the reference roller 431 includes a background surface (an example of the second background surface) that serves as background for the read sheet. For example, as illustrated in FIG. 6, the reference roller 431 includes the background surface which occupies the half of the standby surface. The background surface has a background color (for example, black) which is distinguishable from the outline of the sheet in the same manner as with the first guide unit 611.

The scanner module 432 includes a light source for lighting the sheet to be read and an image sensor such as a CCD or CIS. The scanner module 432 generates image data of the sheet back surface by reading the back surface of the transported sheet. In addition, the scanner module 432 generates the reference data by imaging the reference surface with the lighting source turned on or imaging when the lighting source is turned off.

When the reading of the non-standard sized sheet is performed, the control unit 71 controls the reference roller 431 so that the background surface is positioned facing the reading position of the scanner module 432. On the other hand, when the reading of the standard sized sheet is performed, the control unit 71 controls the reference roller 431 so that the portion other than the background surface among the standby surface is positioned facing the reading position of the scanner module 432.

In the following description, for the purpose of simplifying the description, when there is no appreciable difference between the front surface and the back surface, the front surface guide 61 and the reference roller 431 including the reference surface are collectively referred to as the reference plate.

Figure 8:
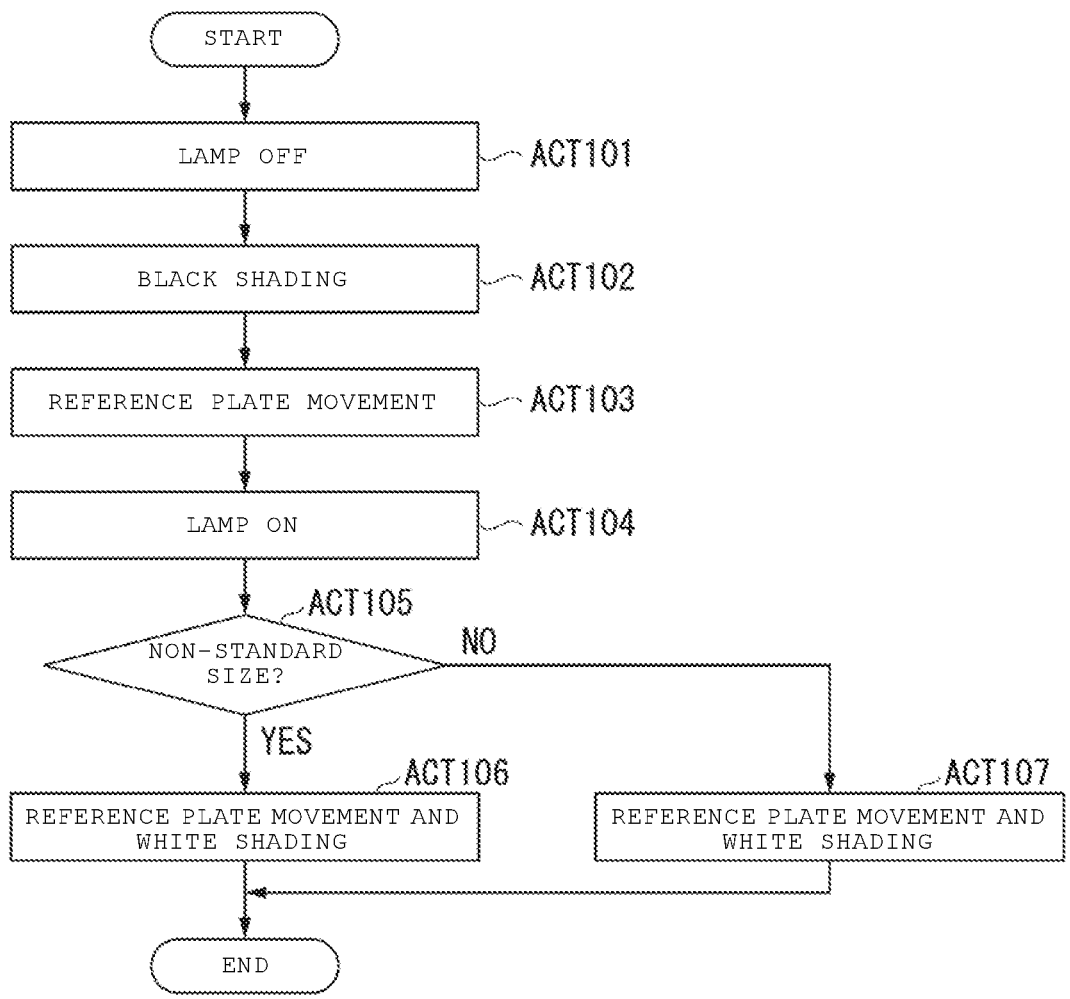
FIGS. 8-11 are flow charts illustrating an example sequence of operations of a shading correction when a reading job is started.

FIG. 8 is a flow chart illustrating an example sequence of operations of a shading correction when a reading job is started. First, when the process is started, the reference surface is positioned at the standby position. The standby position of the first reading unit 50 is a position in which the first reading unit 50 can read the reference surface. The standby position of the first reading unit 50 is set as the standby position so that the shading correction unit 72 can rapidly implement the white shading correction subsequent to the black shading correction. In addition, the standby position of the second reading unit 43 is a position of the reference surface when the standby surface is positioned at the reading position of the image reading unit 200. The control unit 71 first turns off the light source of the image reading unit 200 (ACT 101). The control unit 71 acquires the image data to be reference data in the black shading correction by performing the reading operation in the image reading unit 200 in a state where the light source is turned off. The shading correction unit 72 executes the black shading correction with respect to the image reading unit 200 based on the acquired image data (ACT 102). The above is the process relating to the black shading correction. When the black shading correction is ended, the shading correction unit subsequently executes the white shading correction.

Specifically, the control unit 71 then moves the reference surface from the standby position to a contaminant detection start position (ACT 103). The contaminant detection start position is a position of the reference surface relative to the image reading unit 200 when the shading correction unit 72 starts detection of a contaminant adhered on the reference surface. For example, the contaminant detection start position is a position of the reference plate when the end portion of the reference surface is positioned at the reading position of the image reading unit 200. When the reference surface is moved to the contaminant detection start position, the control unit 71 turns on the light source of the image reading unit 200 (ACT 104).

Subsequently, the control unit 71 determines whether the size of the sheet to be read is the non-standard size (ACT 105). For example, the size of the sheet to be read is selected by an operation of a user from the various menus which are displayed on the control panel 120. For example, a "name card reading mode" for reading of the name card size, or the like is selected through the control panel 120. For example, when the name card reading mode is selected, the control unit 71 determines that the size of the sheet is the non-standard size, and when the other reading modes are selected, the control unit 71 may determine that the size of the sheet is the standard size.

When the size of the sheet to be read is the non-standard size (ACT 105: YES), the control unit 71 performs the reading of the reference surface with respect to the image reading unit 200 while incrementally moving the reference surface from the contaminant detection start position. The shading correction unit 72 performs the white shading correction based on the image data acquired in such that manner (ACT 106). Specifically, the shading correction unit 72 selects a pixel value having a maximum white level among the pixel values included in each pixel of the acquired image data items as a value indicating that the corresponding portion of the reference surface does not have a contaminant adhered thereto. The shading correction unit 72 performs the shading correction of the image reading unit 200 by using the pixel value acquired as the reference data.

When the white shading correction is ended, the control unit 71 controls the reference plate such that the background surface for the non-standard sized sheet is positioned at the reading position of the image reading unit 200.

On the other hand, when the size of the sheet to be read is not the non-standard size (for example, the reading mode other than the name card reading mode is selected) (ACT 105: NO), the control unit 71 performs the white shading correction in the same manner as in the above (ACT 107). However, in this case, when the shading correction is ended, the control unit 71 also controls the reference plate such that the standby surface other than the background surface is positioned at the reading position of the image reading unit 200.

The reference plate is controlled in such a position, whereby the non-standard sized sheet is read as the image data having the background and the standard sized sheet is read as the image data without the background.

Figure 9:
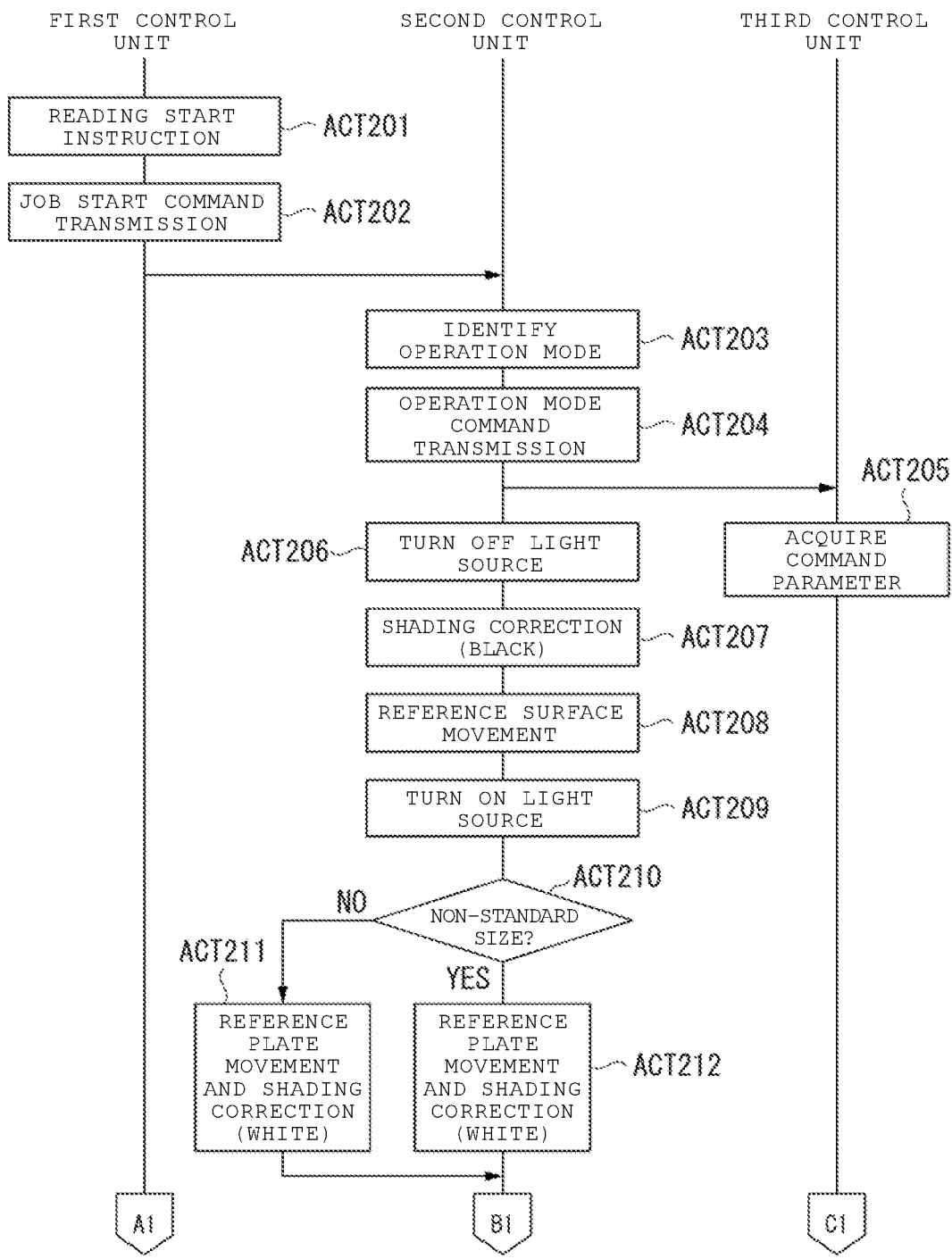
Figure 10:
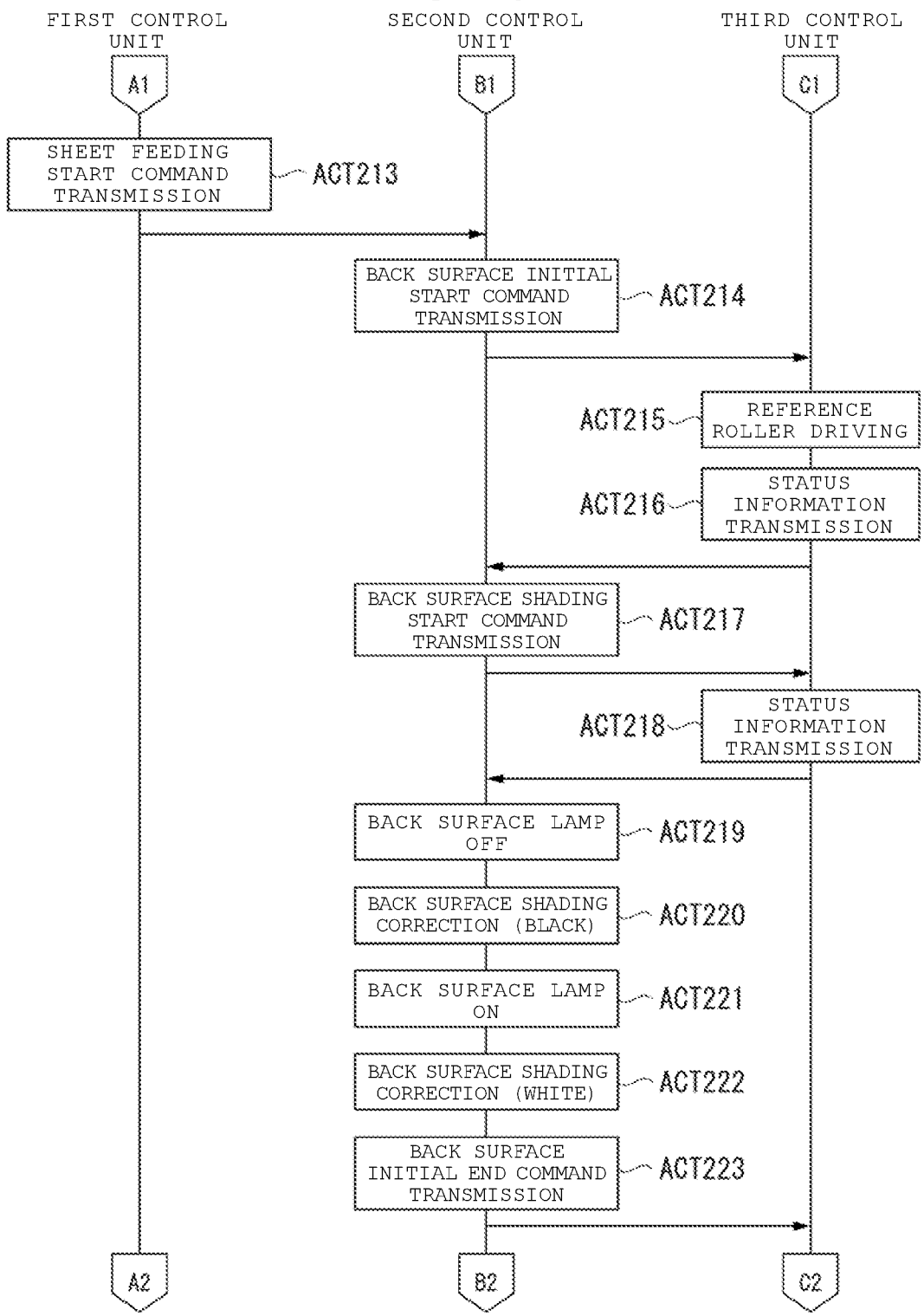
Figure 11:
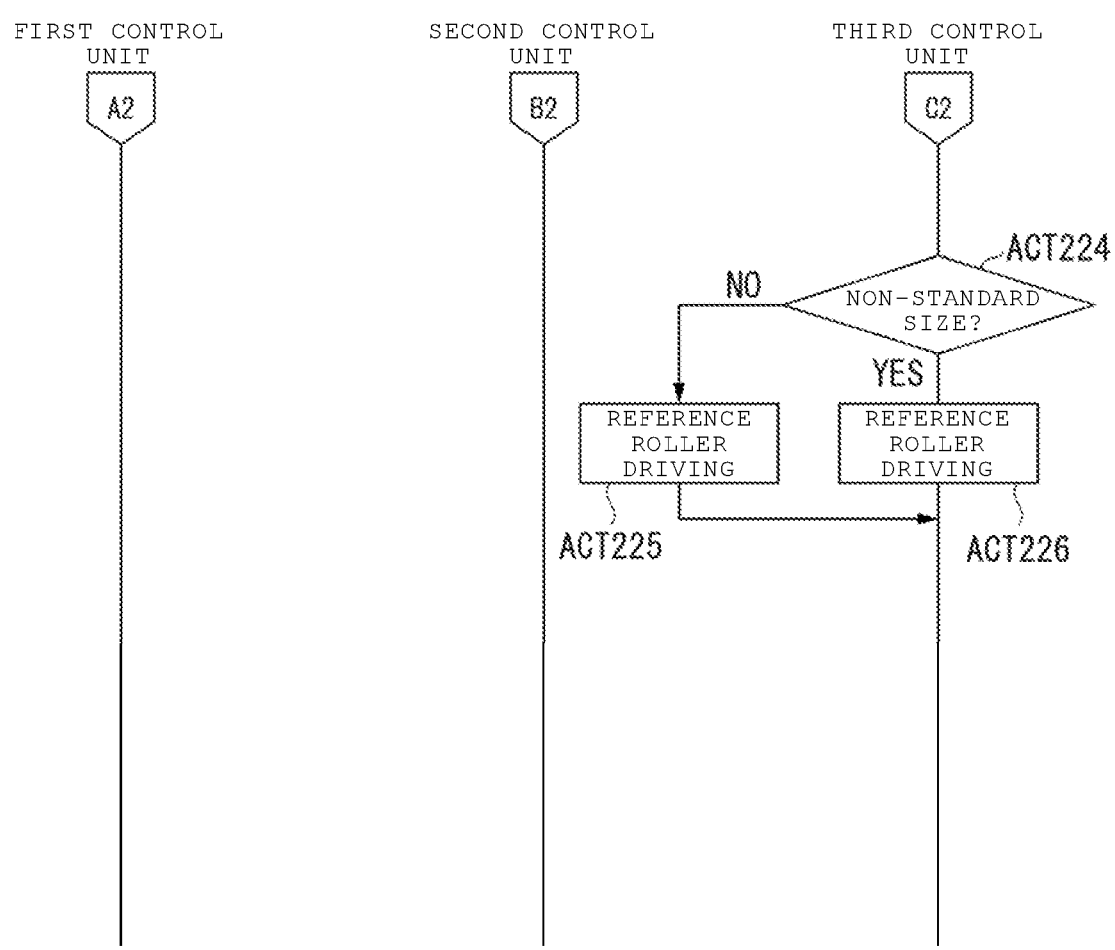

FIGS. 9-11 are flow charts illustrating an example sequence of operations of the shading correction when the reading job is started. Each process described is executed by a first control unit, a second control unit, and a third control unit. For example, the first control unit is implemented by the SYS-CPU 211. In addition, for example, the second control unit is implemented by the SCN-CPU 212. In addition, for example, the third control unit is implemented by the DF-CPU 231.

First, the first control unit receives an input of a reading start instruction input by the user (ACT 201). The first control unit transmits a job start command to the second control unit according to the input of the reading start instruction (ACT 202). The reading start instruction may refer to a copy process for copying the image formed on one sheet to another sheet or a scan process for generating image data based reading the image formed on the sheet. In addition, information indicating an operation mode may be included as a parameter of the job start command. For example, in the present embodiment, there is a non-standard mode for performing the reading of the non-standard sized sheet and a standard mode for performing the reading of the standard sized sheet.

The second control unit identifies the operation mode of the job based on the received job start command (ACT 203). The second control unit generates the operation mode command for instructing the operation in the identified operation mode and transmits the generated operation mode command to the third control unit (ACT 204). The third control unit acquires a command parameter indicating the operation mode from the received operation mode command (ACT 205).

When the operation mode command is transmitted, the second control unit turns off the light source of the front surface (ACT 206). The second control unit reads the reference surface using the first reading unit 50 in a state where the light source of the front surface is turned off. The shading correction unit 72 acquires the black reference data based on the image data acquired in the state where the light source is turned off. The shading correction unit 72 performs the black shading correction based on the acquired black reference data (ACT 207).

Subsequently, the second control unit controls the position of the front surface guide 61 so that the reference surface of the front surface is positioned at the reading position of the first reading unit 50 (ACT 208). The second control unit turns on the light source of the front surface (ACT 209). The second control unit determines whether the size of the sheet to be read is the non-standard size (ACT 210). When the size of the sheet to be read is not the non-standard size (for example, the reading mode other than the name card reading mode is selected) (ACT 210: NO), the second control unit performs the reading of the reference surface with respect to the first reading unit 50 while incrementally moving the reference surface from the contaminant detection start position. The shading correction unit 72 performs the white shading correction based on the acquired image data (ACT 211). When the shading correction is ended, the second control unit controls the reference plate so that the standby surface (different from the background surface) is positioned on the reading position of the image reading unit 200.

On the other hand, when the size of the sheet to be read is the non-standard size (for example, the name card reading mode is selected) (ACT 210: YES), the second control unit performs the white shading correction in the same manner as in the above (ACT 212). However, in this case, when the shading correction is ended, the second control unit controls the front surface guide 61 so that the background surface is the background of the non-standard sized sheet positioned at the reading position of the first reading unit 50.

The above is the process of the shading correction with respect to the first reading unit 50 for reading the front surface. Subsequently, the image forming apparatus 100 starts feeding the sheet to be read, and executes the shading correction with respect to the second reading unit 43 for reading the back surface.

Specifically, the first control unit transmits a sheet feeding start command for starting the feeding the sheet to the second control unit (ACT 213). The second control unit transmits a back surface initial start command for driving the reference roller 431 to the third control unit according to the receiving of the sheet feeding start command (ACT 214). The third control unit drives the reference roller 431 according to the receiving of the back surface initial start command (ACT 215). Specifically, the third control unit rotates the reference roller 431 so that the reference surface is positioned at the reading position of the second reading unit 43. The third control unit transmits status information for notifying the second control unit that the driving of the reference roller 431 is ended (ACT 216).

The second control unit transmits the back surface shading start command for starting the shading correction of the second reading unit 43 with respect to the third control unit according to the receiving of the status information (ACT 217). The third control unit detects a start request of the shading correction with respect to the second reading unit 43 by receiving the back surface shading start command. When the start request of the shading correction is detected, the third control unit transmits the status information for instructing the execution of the shading correction with respect to the second control unit (ACT 218). The second control unit turns off the light source of the back surface in response to the receiving the status information (ACT 219). The second control unit reads the reference surface with the second reading unit 43 in a state where the light source of the back surface is turned off. The shading correction unit 72 acquires the black reference data based on the image data acquired in a state where the light source is turned off. The shading correction unit 72 performs the black shading correction based on the acquired black reference data (ACT 220). When the black shading correction is ended, the second control unit turns on the light source of the back surface (ACT 221). At this time, by the process of ACT 215, the reference surface of the reference roller 431 is positioned at the reading position of the second reading unit 43. In this state, the second control unit reads the reference surface with the second reading unit 43 in a state where the light source of the back surface is turned off. The shading correction unit 72 acquires the white reference data based on the image data acquired in the state where the light source is turned on. The shading correction unit 72 performs the white shading correction based on the acquired white reference data (ACT 222). When the white shading correction is ended, the second control unit transmits a back surface initial end command for notifying the third control unit of the notification that the shading correction is ended (ACT 223).

The third control unit determines whether the size of the sheet to be read is the non-standard size according to the receiving the back surface initial end command (ACT 224). When the size of the sheet to be read is not the non-standard size (for example, the reading mode other than the name card reading mode is selected) (ACT 224: NO), the third control unit drives the reference roller 431 (ACT 225). Specifically, the third control unit rotates the reference roller 431 so that the standby surface is positioned at the reading position of the second reading unit 43. On the other hand, when the size of the sheet to be read is the non-standard size (for example, the name card reading mode is selected) (ACT 224: YES), the third control unit drives the reference roller 431 (ACT 226). In this case, the third control unit rotates the reference roller 431 so that the background surface is positioned at the reading position of the second reading unit 43.

Figure 12:
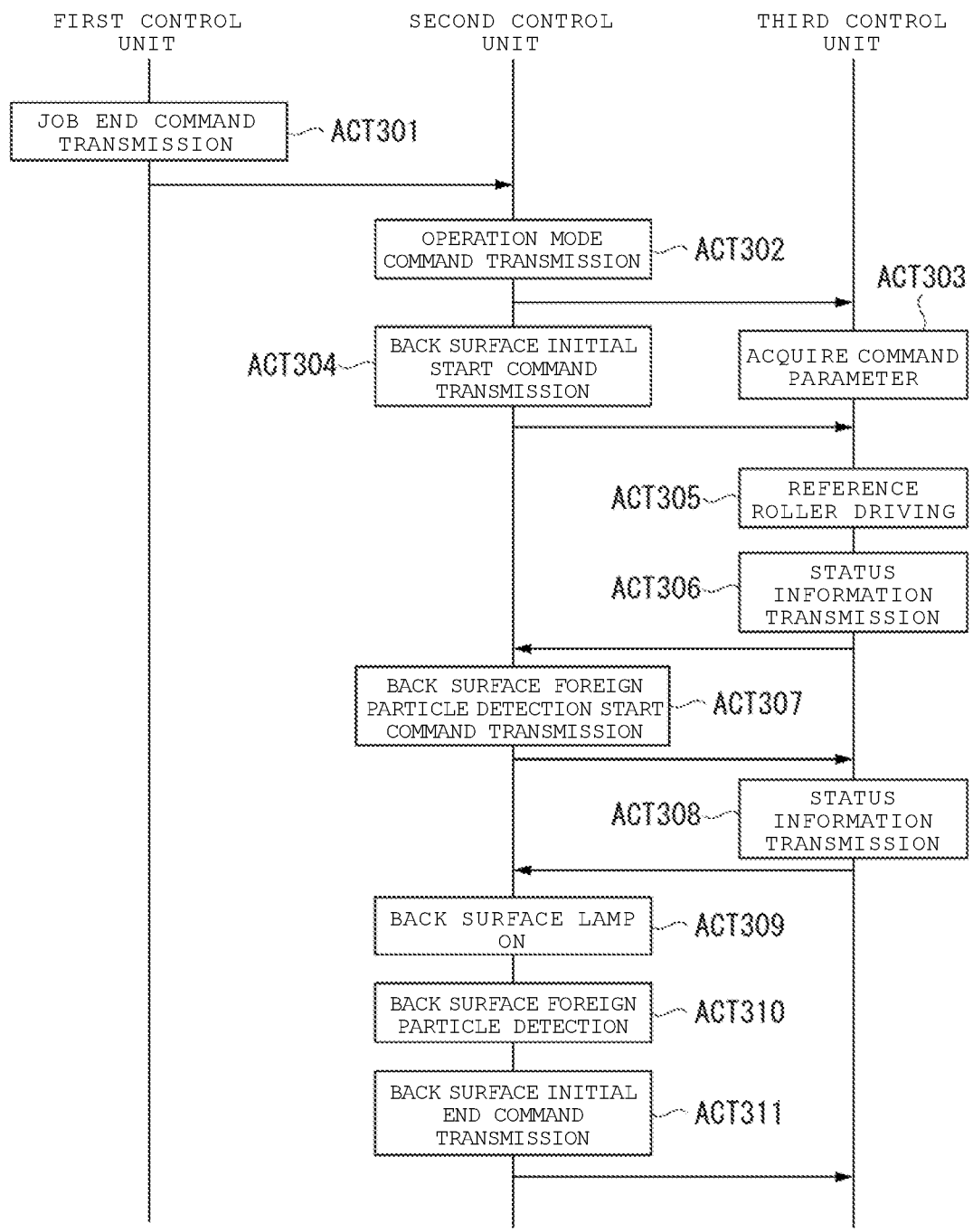
FIGS. 12-14 are flow charts illustrating an example sequence of operations of the shading correction when the reading job is ended.
Figure 13:
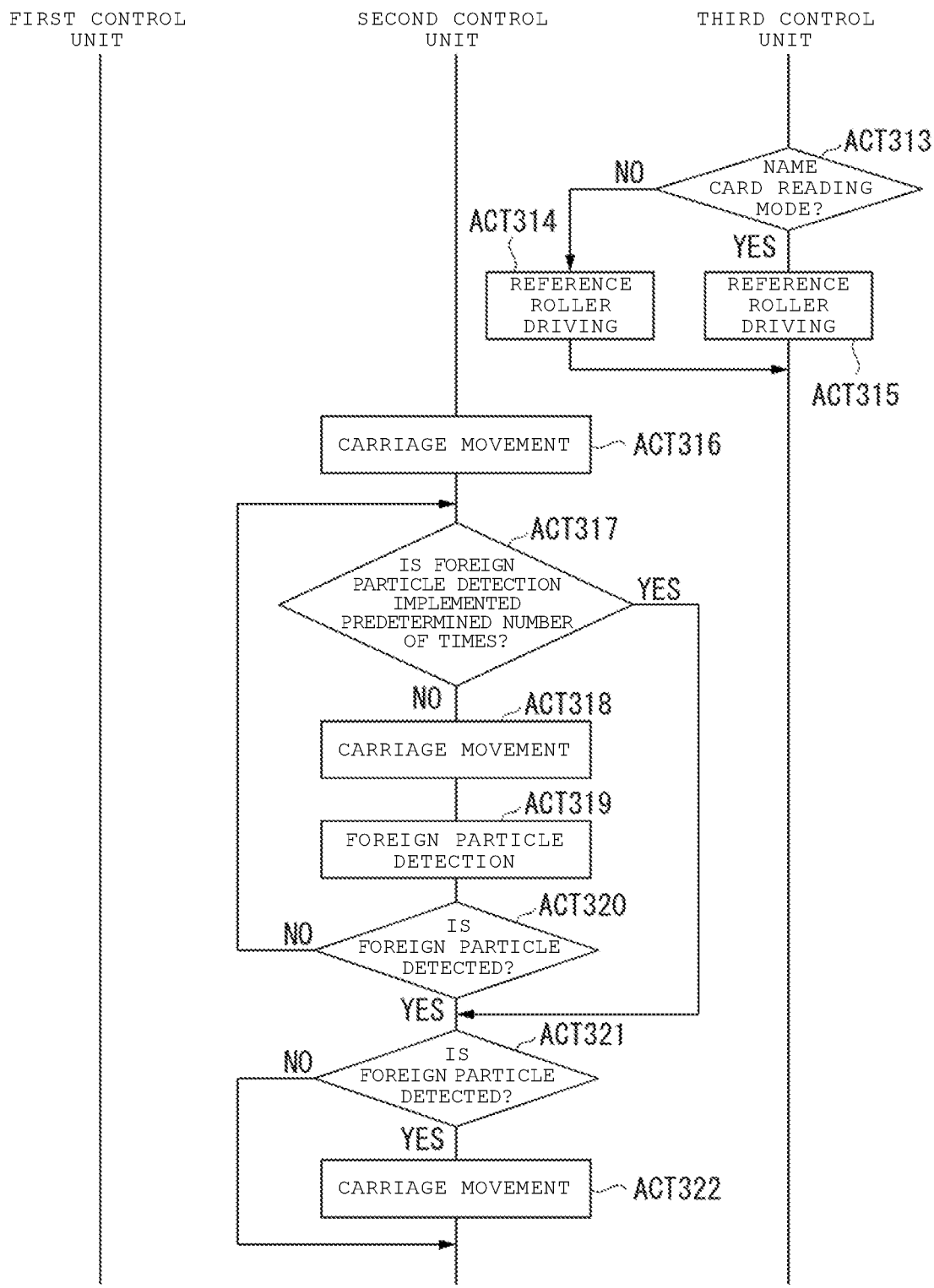
Figure 14:
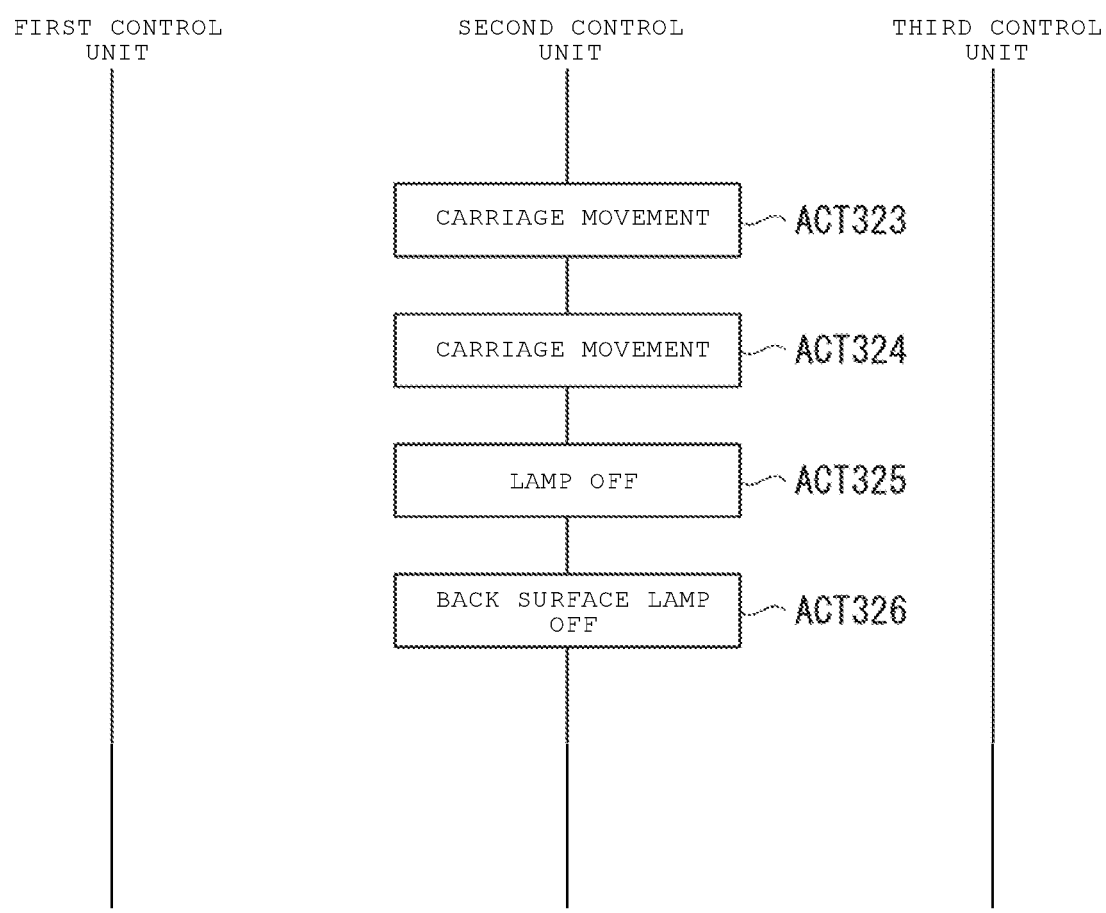

FIGS. 12-14 are flow charts illustrating and example sequence of operations of the shading correction when the reading job is ended. Each process described is executed by the first control unit, the second control unit, and the third control unit in the same manner as in FIGS. 9-11.

First, the first control unit transmits a job end command to the second control unit according to the end of the reading job of the sheet (ACT 301). The second control unit transmits the operation mode command for instructing the operation when the size of the sheet to be read is not the non-standard size to the third control unit (ACT 302). The third control unit acquires the command parameter indicating the operation mode from the received operation mode command (ACT 303).

When the operation mode command is transmitted, the second control unit transmits the back surface initial start command for driving the reference roller 431 to the third control unit (ACT 304). The third control unit drives the reference roller 431 according to the receiving the back surface initial start command (ACT 305). Specifically, the third control unit rotates the reference roller 431 so that the reference surface is positioned on the reading position of the second reading unit 43. The third control unit transmits the status information for notifying the second control unit that the driving of the reference roller 431 is ended (ACT 306).

The second control unit transmits a back surface contaminant detection start command for starting a process (hereinafter, referred to as a "back surface contaminant detection process") for detecting whether a contaminant is adhered to the reference surface (ACT 307). The third control unit detects a start request of the back surface contaminant detection process by receiving the back surface contaminant detection start command. When the start request of the back surface contaminant detection process is detected, the third control unit transmits the status information for instructing the execution of the back surface contaminant detection process with respect to the second control unit (ACT 308). The second control unit turns on the light source of the back surface according to the receiving of the status information (ACT 309). The second control unit reads the reference surface with the second reading unit 43 in the state where the light source of the back surface is turned on. The shading correction unit 72 detects whether a contaminant is adhered to the reference surface based on the image data of the reference surface acquired in the state where the light source is turned on (ACT 310). When the back surface contaminant detection process is ended, the second control unit transmits the back surface initial end command for notifying the third control unit of the notification that the back surface contaminant detection process is ended (ACT 311).

Subsequently, the third control unit determines whether the size of the sheet to be read is the non-standard size based on the receiving of the back surface initial end command (ACT 313). When the size of the sheet to be read is not the non-standard size (for example, the reading mode other than the name card reading mode is selected) (ACT 313: NO), the third control unit drives the reference roller 431 (ACT 314). Specifically, the third control unit rotates the reference roller 431 such that the standby surface is positioned at the reading position of the second reading unit 43. On the other hand, when the size of the sheet to be read is the non-standard size (for example, the name card reading mode is selected) (ACT 313: YES), the third control unit rotates the reference roller 431 such that the background surface is positioned at the reading position of the second reading unit 43 (ACT 315).

Subsequently, the second control unit executes a process (hereinafter, referred to as a "front surface contaminant detection process") for detecting whether a contaminant is adhered to the reference surface of the front surface with respect to the shading correction unit 72. Specifically, by moving the first reading unit 50, the second control unit moves the reference surface from the standby position to the contaminant detection start position (ACT 316). The first reading unit 50 includes a carriage that moves the first reading unit 50, and the second control unit moves the position of the first reading unit 50 by controlling the operation of the carriage. Here, the front surface contaminant detection process is performed based on the image data of the reference surface which is read while incrementally moving the reference surface from the contaminant detection start position. Hereinafter, the process for detecting the contaminant is referred to as the front surface contaminant detection process.

The second control unit determines whether the front surface contaminant detection process is executed a predetermined number of times (ACT 317). For example, the predetermined number of times may be the maximum times of the executable front surface contaminant detection process. In this case, the number of the maximum execution times is determined by a movement amount of the reference surface and a length of the reference surface in a movement direction. For example, when the length of the reference surface in the movement direction is set as 10, and when the movement amount of the reference surface moving for one time front surface contaminant detection process is set as 1, the number of the maximum execution times is set as 10. The predetermined number of times is not necessarily set as the maximum execution times, and may be any number of times as long as the number of times is equal to or smaller than the number of the maximum execution times.

When the front surface contaminant detection process is not executed the predetermined number of the times (ACT 317: NO), the second control unit reads the reference surface to the first reading unit 50 while moving the first reading unit 50 (ACT 318). The shading correction unit 72 detects whether a contaminant is adhered to the reference surface based on the read image data of the reference surface (ACT 319). The second control unit determines whether the contaminant of the reference surface is detected (ACT 320). When the contaminant of the reference surface is not detected (ACT 320: NO), the second control unit returns the process to ACT 317. In this time, by executing ACT 318, the reading position of the first reading unit 50 is matched with the next detection position of the reference surface.

On the other hand, when the contaminant of the reference surface is detected (ACT 320: YES) or when the front surface contaminant detection process is executed the predetermined number of the times (ACT 317: YES), the second control unit determines whether the contaminant of the reference surface is detected in any of the executed front surface contaminant detection processes (ACT 321). When the contaminant of the reference surface is detected in any of the executed front surface contaminant detection processes (ACT 321: YES), the second control unit moves the first reading unit 50 so that the second guide unit 612 is positioned at the reading position of the first reading unit 50 (ACT 322).

On the other hand, when the contaminant of the reference surface is not detected in any of the executed front surface contaminant detection process (ACT 321: NO), the second control unit moves the first reading unit 50 to an initial position without executing ACT 322 (ACT 323). Here, the initial position is a position where the first reading unit 50 faces the second guide unit 612 while sandwiching a platen glass. The second control unit moves the first reading unit 50 to the standby position after the first reading unit 50 is moved to the initial position (ACT 324). Thereafter, the control unit ends the processes (ACT 325 and ACT 326) by tuning off the light sources of the front surface and the back surface.

The image forming apparatus 100 according to the embodiment includes a control unit that controls a position or a direction of the reference plate with respect to the image reading unit 200 according to the size of the sheet to be read. By such a configuration, the image forming apparatus 100 can further correctly read the non-standard sized sheet.

Hereinafter, modification examples of the image reading apparatus and the image reading method according to embodiment will be described.

The image reading unit 200 which is provided on the image forming apparatus 100 according to the above-described embodiment may be provided as an image reading apparatus which is independent from the image forming apparatus 100.

The image forming apparatus 100 according to the above-described embodiment may further include a heating unit that decolors an image formed using a decolorable toner for decoloring by the heat by heating of the sheet. In this case, the heating unit may be obtained by a fixing unit of the printer unit 130.

A name card size according to the above-described embodiment is an example of a sheet size (non-standard size) smaller than the standard size. The non-standard size may be any sheet size other than the name card size as long as the sheet size is smaller than the standard size.

In this embodiment, "decoloring" means to make it difficult to recognize a color of an image formed on an image receiving member after the image is formed on the image receiving member by a recording material which has different color from the color of the image receiving material. The color of recording material may be any color including black, white, or a chromatic color. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reading apparatus, comprising:
an input device configured to receive an input of a sheet size;
an image reading unit configured to generate reference data by reading a reference surface and to generate image data by reading a sheet;
a reference plate that includes the reference surface for generating reference data for shading correction of the image reading unit and a background surface for background of a sheet to be read to generate the image data;
a control unit configured to:
determine whether the input sheet size is a non-standard size or a standard size,
if the input sheet size is determined to be the non-standard size, control the image reading unit to generate first reference data by reading the reference surface of the reference plate while incrementally moving the reference surface relative to the image reading unit so that, after the first reference data is generated, the reference surface is positioned at a reading position of the image reading unit, and
if the input sheet size is determined to be the standard size, control the image reading unit to generate second reference data by reading the reference surface of the reference plate while incrementally moving the reference surface relative to the image reading unit so that, after the second reference data is generated, the background surface is positioned at the reading position of the image reading unit; and
a shading correction unit configured to perform the shading correction in the image reading unit based on the generated first or second reference data.

2. The apparatus according to claim 1, wherein the shading correction unit detects a contaminant adhered to the reference surface based on the reference data.

3. The apparatus according to claim 1, wherein the image reading unit includes a first reading unit that reads a front surface of a sheet and a second reading unit that reads a back surface of the sheet.

4. The apparatus according to claim 3, wherein
the reference plate is a first reference plate having a plane surface facing the first reading unit, the plane surface including the reference surface and the background surface, and
the apparatus further comprises a second reference plate having roller surface facing the second reading unit, the roller surface including a second reference surface and a second background surface.

5. The apparatus according to claim 1, wherein the background surface includes a first background surface that is distinguishable from the sheet to be read and a second background surface having a different color than the first background surface.

6. The apparatus according to claim 1, wherein the reference plate is on a reference roller.

7. The apparatus according to claim 6, wherein the control unit moves the reference surface relative to the image reading unit by rotating the reference roller.

8. The apparatus according to claim 1, wherein the control unit moves the reference surface relative to the image reading unit by moving the image reading unit.

9. A method for generating image data, comprising:
receiving an input of a sheet size;
determining whether the input sheet size is a non-standard size or a standard size;
generating, with an image reading unit, first or second reference data and controlling movement of a reference plate relative to the image reading unit, the reference plate including a reference surface for generating reference data for shading correction of the image reading unit and a background surface for background of a sheet to be read to generate image data, based on whether the input sheet size is the non-standard size or the standard size so that:
  if the input sheet size is determined to be the non-standard size, the image reading unit generates the first reference data by reading the reference surface of the reference plate while the reference surface is incrementally moved relative to the image reading unit so that, after the first reference data is generated, the reference surface is positioned at a reading position of the image reading unit, and
  if the input sheet size is determined to be the standard size, the image reading unit generates the second reference data by reading the reference surface of the reference plate while incrementally moving the reference surface relative to the image reading unit so that, after the second reference data is generated, the background surface is positioned at the reading position of the image reading unit; and
performing the shading correction in the image reading unit based on the generated first or second reference data.

10. The method according to claim 9, wherein the shading correction includes detecting a contaminant adhered to the reference surface based on the reference data.

11. The method according to claim 9, wherein the background surface includes a first background surface that is distinguishable from the sheet to be read and a second background surface having a different color than the first background surface.

12. The method according to claim 9, wherein the reference plate is on a reference roller.

13. The method according to claim 12, wherein the control unit moves the reference surface relative to the image reading unit by rotating the reference roller.

14. The method according to claim 9, wherein the control unit moves the reference surface relative to the image reading unit by moving the image reading unit.

* * * * *